United States Patent
Walley et al.

(10) Patent No.: US 10,601,462 B2
(45) Date of Patent: Mar. 24, 2020

(54) COORDINATED BACKGROUND TRAINING IN A FULL-DUPLEX HYBRID FIBER-COAXIAL NETWORK

(71) Applicant: Maxlinear, Inc., Carlsbad, CA (US)

(72) Inventors: Kenneth Scott Walley, Carlsbad, CA (US); Steve Krapp, Naperville, IL (US); Eitan Tsur, Tel Aviv (IL); Sridhar Ramesh, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/356,216

(22) Filed: Mar. 18, 2019

(65) Prior Publication Data

US 2019/0288742 A1 Sep. 19, 2019

Related U.S. Application Data

(60) Provisional application No. 62/644,655, filed on Mar. 19, 2018.

(51) Int. Cl.
*H04B 3/23* (2006.01)
*H04L 5/18* (2006.01)
*H04L 12/64* (2006.01)
*H04L 12/28* (2006.01)

(52) U.S. Cl.
CPC ............ *H04B 3/238* (2013.01); *H04L 5/18* (2013.01); *H04L 12/2898* (2013.01); *H04L 12/6418* (2013.01); *H04L 2012/6421* (2013.01); *H04L 2012/6491* (2013.01)

(58) Field of Classification Search
CPC ....... H04B 3/238; H04L 5/18; H04L 12/2898; H04L 12/6418; H04L 2012/6421; H04L 2012/6491
See application file for complete search history.

(56) References Cited

U.S. PATENT DOCUMENTS

| | | | |
|---|---|---|---|
| 2018/0287659 A1 | 10/2018 | Ramesh | |
| 2018/0343033 A1* | 11/2018 | Sun | ......... H04B 3/487 |
| 2019/0028145 A1* | 1/2019 | Sun | ......... H04B 3/238 |

OTHER PUBLICATIONS

Data-Over-Cable Service Interface Specifications DOCSIS® 3.1 Physical Layer Specification CM-SP-PHYv3.1-113-171220, © Cable Television Laboratories, Inc. 2013-2017 (295 pgs).

\* cited by examiner

*Primary Examiner* — Sophia Vlahos
(74) *Attorney, Agent, or Firm* — Maschoff Brennan; Jason W. Croft

(57) ABSTRACT

A cable modem comprises transceiver circuitry and echo cancellation training circuitry. The transceiver circuitry may be operable to transmit and receive signals on a full-duplex Data Over Cable System Interface Specification (DOCSIS®) network. The echo cancellation training circuitry may be operable to: determine an echo cancellation training group to which the electronic communication device belongs; determine one or more training periods during which the echo cancellation training group is permitted to transmit training signals; and transmit an echo cancellation training signal during the determined training one or more periods and use the transmitted training signal to train echo cancellation circuitry of the cable modem.

20 Claims, 8 Drawing Sheets

US 10,601,462 B2

COORDINATED BACKGROUND TRAINING IN A FULL-DUPLEX HYBRID FIBER-COAXIAL NETWORK

PRIORITY CLAIM

This application claims the benefit of priority to U.S. Provisional Patent Application 62/644,655 filed Mar. 19, 2018, which is hereby incorporated herein by reference in its entirety.

INCORPORATION BY REFERENCE

This application makes reference to:
U.S. patent application Ser. No. 15/938,937 titled "Full Duplex DOCSIS Cable Modem Echo Cancellation with Training" and filed on Mar. 28, 2018; and
U.S. patent application Ser. No. 16/294,244 titled "Foreground Training in a Hybrid Fiber-Coaxial Network with Remote-PHY" and filed on Mar. 6, 2019.
Each of the above-referenced documents is hereby incorporated herein by reference in its entirety.

BACKGROUND

Conventional systems and methods for communications can be overly power hungry, slow, expensive, and inflexible. Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Systems and methods for coordinated background training in a full-duplex hybrid fiber-coaxial network, substantially as shown in and/or described in connection with at least one of the figures, as set forth more completely in the claims.

Advantages, aspects and novel features of the present disclosure, as well as details of various implementations thereof, will be more fully understood from the following description and drawings.

DETAILED DESCRIPTION OF THE INVENTION

Figure 1A:
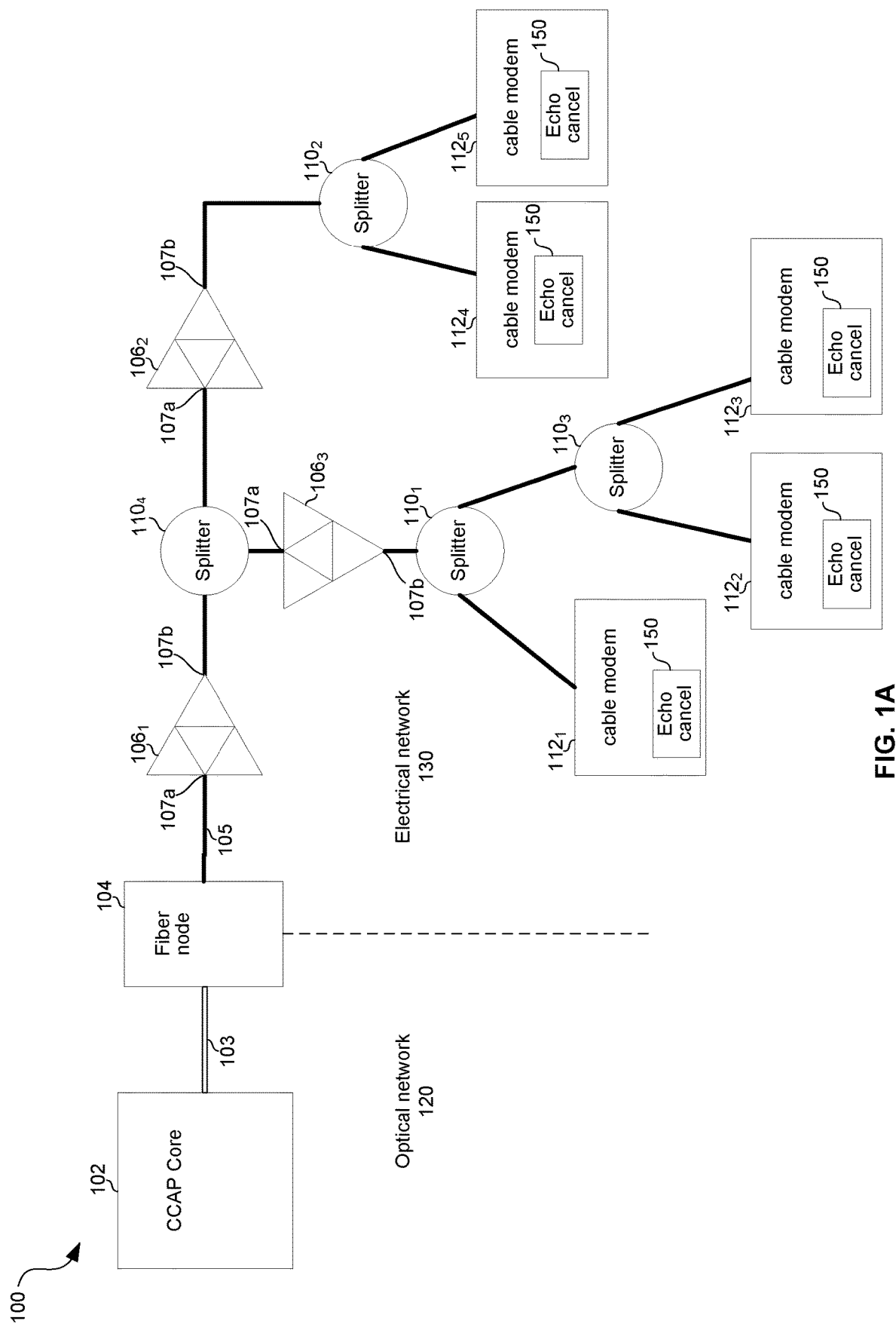
FIG. 1A is a diagram depicting an example hybrid fiber-coaxial (HFC) network.

FIG. 1A is a diagram depicting an example hybrid fiber-coaxial (HFC) network. The example HFC network 100 comprises a converged cable access platform (CCAP) core 102, a remote-PHY fiber node 104, amplifiers $106_1$-$106_3$, splitters $110_1$-$110_4$, and cable modems (CMs) $112_1$-$112_5$.

The CCAP core 102 comprises circuitry operable to handle data over coaxial service interface specification (DOCSIS) traffic to and from the cable modems $112_1$-$112_5$. The CCAP core 102 is operable to manage the allocation/reservation of frequency bands (resource blocks) on the network 100. The CCAP core 102 comunicates with remote-PHY node 104 via fiber 103.

The remote-PHY fiber node 104 comprises circuitry operable to provide an interface between the optical network 120 and the electrical network 130. The fiber node 104 is operable to communicate full-duplex on one or more frequency bands on the electrical network 130, as described in more detail below with reference to FIG. 2. The fiber node 104 is operable to support coordinated training of cable modems, as described in more detail below with reference to FIGS. 3-5. The fiber node 104 is coupled to amplifier $106_1$ via coaxial cable 105.

Each of the amplifiers $106_1$-$106_3$ may comprise a bidirectional amplifier which may amplify downstream signals and upstream signals, where downstream signals are input via upstream interface 107a and output via downstream interface 107b, and upstream signals are input via downstream interface 107b and output via upstream interface 107a. The amplifier $106_1$, which amplifies signals along the main coaxial "trunk," may be referred to as a "trunk amplifier." The amplifiers $106_2$ and $106_3$, which amplify signals along "branches" split off from the trunk, may be referred to as "branch" or "distribution" amplifiers.

Each of the splitters $110_1$-$110_4$ comprises circuitry operable to output signals incident on each of its interfaces onto each of its other interfaces. Each of the splitters $110_1$-$110_4$ may be a passive or active device which supports bidirectional transfer of signals.

Each of the cable modems $112_1$-$112_5$ is operable to communicate with, and be managed by, the CCAP core 102 in accordance with one or more standards (e.g., DOCSIS 3.0 and/or 3.1). Each of the cable modems $112_1$-$112_5$ may reside at the premises of a cable/DOCSIS subscriber. Each of the cable modems $112_1$-$112_5$ comprises echo cancellation circuitry 150.

Figure 1B:
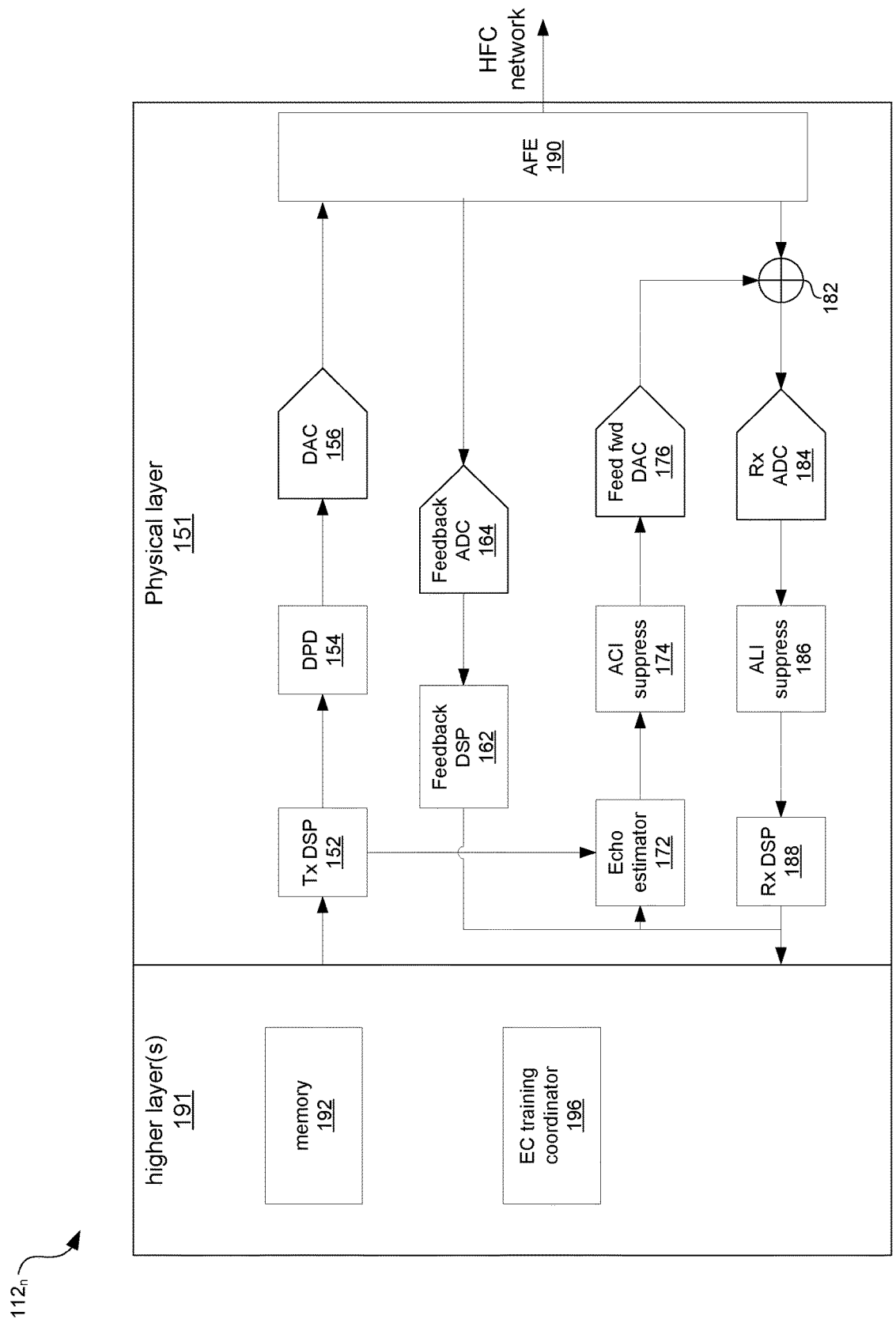
FIG. 1B illustrates example circuitry of a full duplex DOCSIS cable modem operable to perform coordinated background echo cancellation training

FIG. 1B illustrates example circuitry of a full duplex DOCSIS cable modem $112_n$ operable to perform coordinated background echo cancellation training The higher layer circuitry 191 comprises memory 192 and echo canceller training coordination circuitry 196. The echo canceller training coordination circuitry 196 and memory 192 interoperate to generate data frames to be transmitted via the physical layer circuitry 151 and to process data frames received from the physical layer circuitry.

The cable modem $112_n$ comprises physical layer circuitry 151 and higher layer (e.g., media access control (MAC) layer and, optional, one or more layers above that). The physical layer circuitry 151 comprises analog front end (AFE) circuitry 190, transmit digital signal processing (DSP) circuitry 152, digital predistortion (DPC) circuitry 154, upstream (US) digital to analog conversion (DAC) circuitry 156, combiner circuitry 182, downstream (DS) analog-to-digital 184, adjacent leakage interference (ALI) cancelation circuitry 186, and receive digital signal processing (DSP) circuitry 188. The physical layer circuitry 151 also comprises circuitry for echo cancellation comprising feedback (FB) ADC circuitry 164, FB DSP 162, and echo estimator 172, adjacent channel interference (ACI) cancelation circuitry 174, and feed forward (FF) DAC circuitry 176. In an example implementation, one or more of the components of physical layer circuitry 151 correspond to the echo cancellation circuitry 150 of FIG. 1A.

Figure 2:
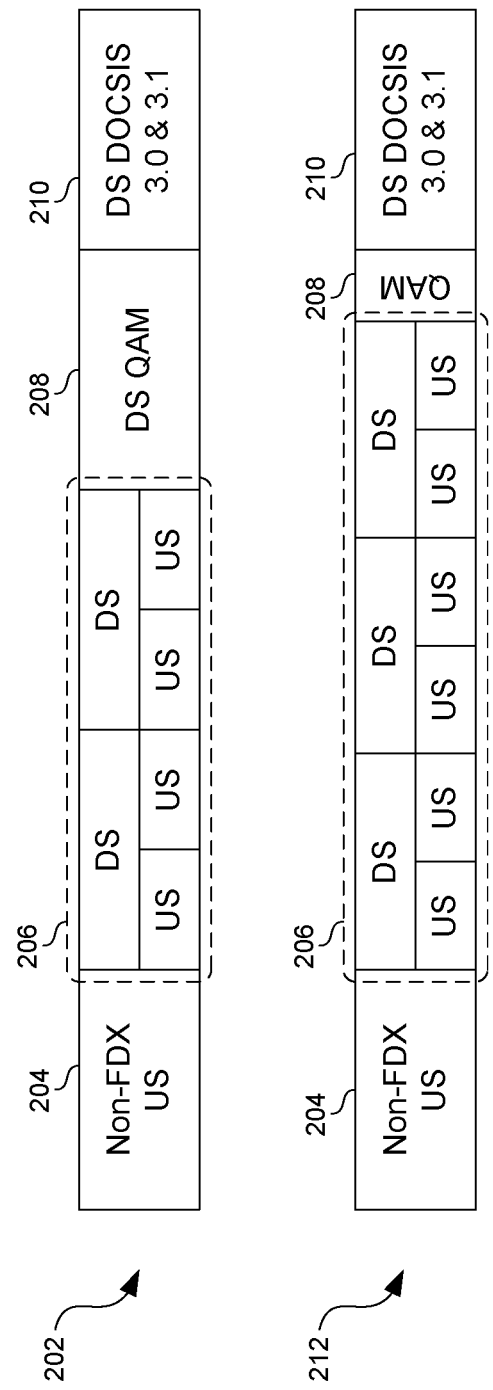
FIG. 2 shows example frequency plans for a full-duplex Data Over Cable Service Interface Specification (DOCSIS®) network.

FIG. 2 shows example frequency plans for full-duplex DOCSIS network. The two example frequency plans each comprise a band of frequencies 204 that is used only for upstream (US), a full-duplex band of frequencies 206 that are used for downstream and upstream, a band of frequencies 208 used only for downstream cable television ("QAM") signals, and a band of frequencies 210 used for downstream DOCSIS signals (e.g., per the DOCSIS® 3.0 or 3.1 standard(s)). In an example implementation, the fiber node 104 communicates full-duplex on subbands within band 206, but each cable modem 112 communicates in only one direction on subbands within band 206. Nevertheless, because the subbands in band 206 are dynamically assigned, per cable modem, to either upstream (US) or downstream (DS), a cable modem operating on one or more of the subbands in band 206 must be able to support upstream and downstream on each of the subbands within band 206. This means that a cable modem $112_n$ cannot use fixed diplexer filters for suppressing adjacent channel interference (ACI) and adjacent leakage interference (ALI) on the band 206. Furthermore, configurable diplexer filters are very difficult and costly to implement. Accordingly, the cable modems 112 may comprise echo cancellation circuitry for dealing with ACI and ALI on band 206. For example, the echo cancellation target may be ~50 dB of margin for ACI and ~55 dB of margin for ALI to ensure the ability to receive 4K QAM DS.

Figure 3A:
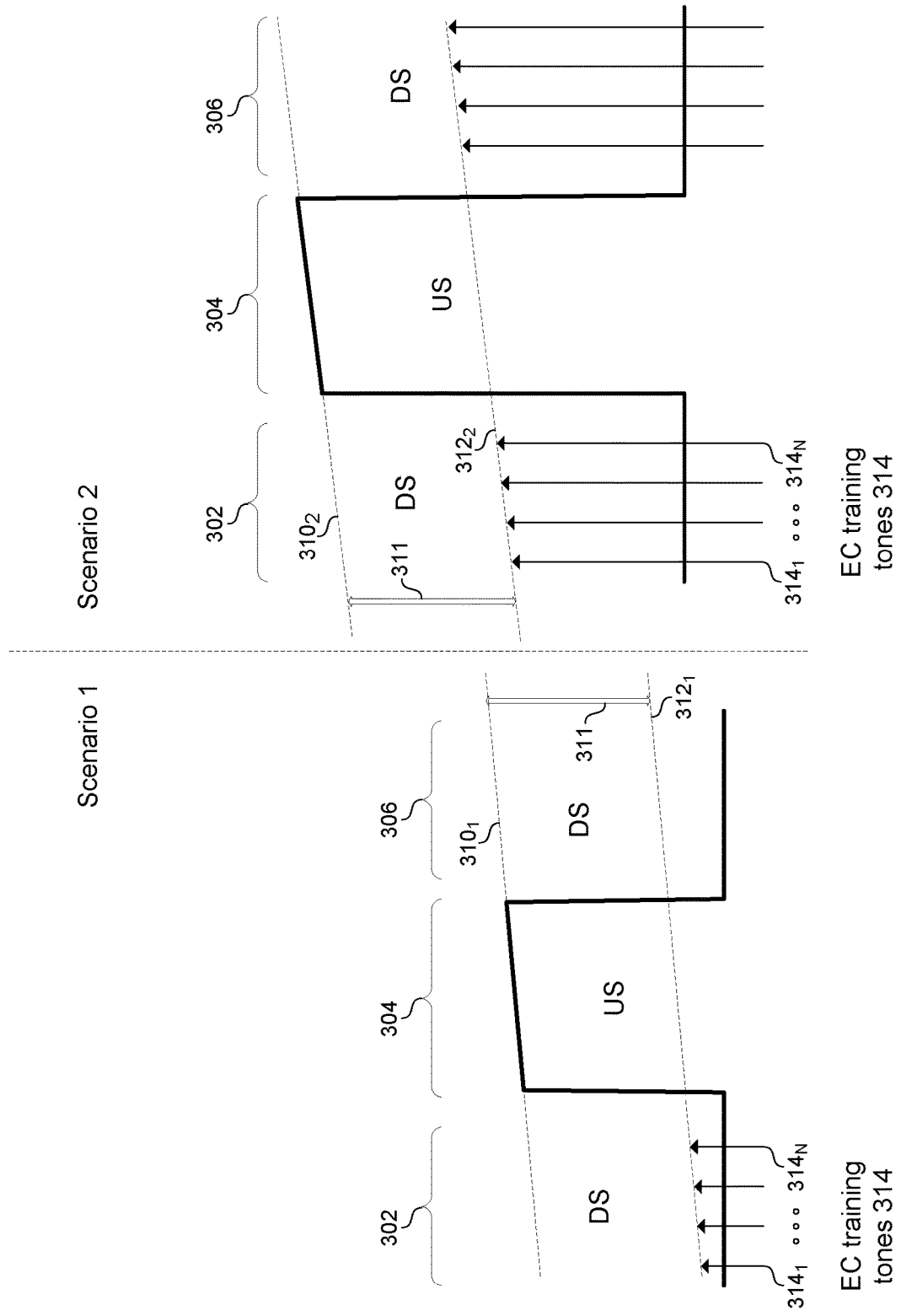
FIGS. 3A and 3B show example echo canceller training signals in accordance with an example implementation of this disclosure.
Figure 3B:
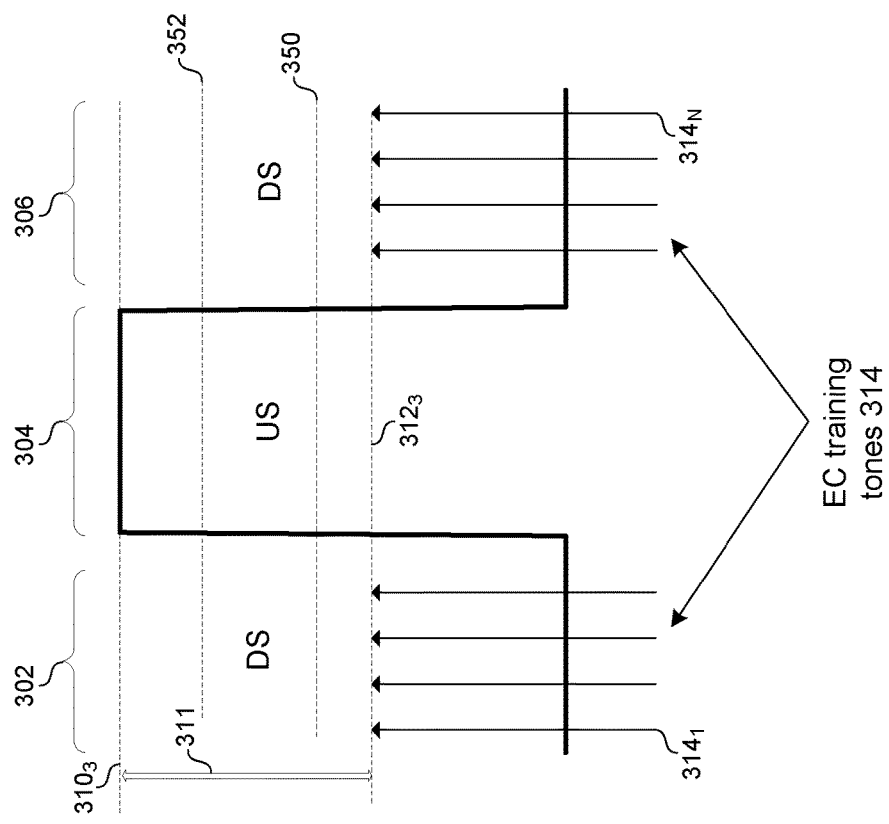

FIGS. 3A and 3B show example echo canceller training signals in accordance with an example implementation of this disclosure. In in FIGS. 3A and 3B are three subbands 302, 304, and 306 of band 206 of FIG. 2. In the example shown, subbands 302 and 306 have been assigned as downstream bands for the cable modem $112_n$ and band 304 has been assigned as an upstream band. In scenario 1 of FIG. 3A, ranging has resulted in the cable modem $112_n$ transmit power being set at a level represented by line $310_1$. In scenario 2 of FIG. 3A, ranging has resulted in the cable modem $112_n$ transmit power being set at level $310_2$. The slope of the lines $310_1$ and $310_2$ is the result of pre-emphasis performed by the cable modem to account for frequency-dependent losses in the coaxial cable.

In both scenarios of FIG. 3A, the cable modem $112_n$ transmits an echo cancellation (EC) training signal in subband 302. In this regard, echo cancellation training frames may be generated by the controller 196 interoperating with the memory 192 and then conveyed to the physical layer circuitry 151 which generates the corresponding physical layer signals. In the example implementation shown, the echo cancellation training signal consists of N (an integer) tones $314_1$-$314_N$ spread across the M (an integer) subbands of band 206. For data signals on subband 302, M (an integer) may correspond to the number of subcarriers in OFDM symbols transmitted on subband 302. In an example implementation, the ratio of N to M may be, for example, 1/128. In an example implementation, the strength of the echo cancellation signal is set based on the cable modem's ranged transmit power in the band on which the echo cancellation signal is transmitted. For example, for a cable modem $112_n$ operating in accordance with DOCSIS 3.1 Physical Layer Specification CM-SP-PHYv3.1-I13-171220, the echo cancellation training signal may be transmitted at a level 312 that is 66 dB below the transmit power level 310 (i.e., the distance 311 in FIG. 3A. 3A may be 66 dB in both scenarios 1 and 2). This transmit power may be used regardless of whether the cable modem $112_n$ actually transmits on the band of interest, which is subband 302 in the example of FIG. 3A). In the example shown, transmit power $310_2$ in scenario 2 of FIG. 3A is higher than transmit power level represented by line $310_1$ and the level represented by line $312_2$ is correspondingly higher than $312_1$.

FIG. 3B shows the resulting signal at the fiber node for scenarios 1 and 2 of FIG. 3A. In FIG. 3B, the line $312_3$ corresponds to the power of the training signal of the single cable modem $112_n$ of FIGS. 3A and 3B. In an example implementation, however, multiple cable modems 112 may perform background echo cancellation training at the same time, resulting in an aggregate training signal level 350 that is higher than the level of the echo cancellation training signal from any single cable modem $112_n$. Nevertheless, the level 350 is still below a maxim limit 352 set forth by the applicable standard (e.g., 352 may be set at 42 dB for operation in accordance with DOCSIS 3.1 Physical Layer Specification CM-SP-PHYv3.1-I13-171220). Thus, the fiber node can still successfully receive upstream signals from another modem that is not in an echo canceller training period (and transmitting live data). Accordingly, aspects of this disclosure enable coordinating background echo cancellation training of multiple cable modems such that the number of cable modems performing background training at any given time does not cause aggregate training "noise" (as seen by the fiber node) to exceed the permissible level 352.

Figure 4:
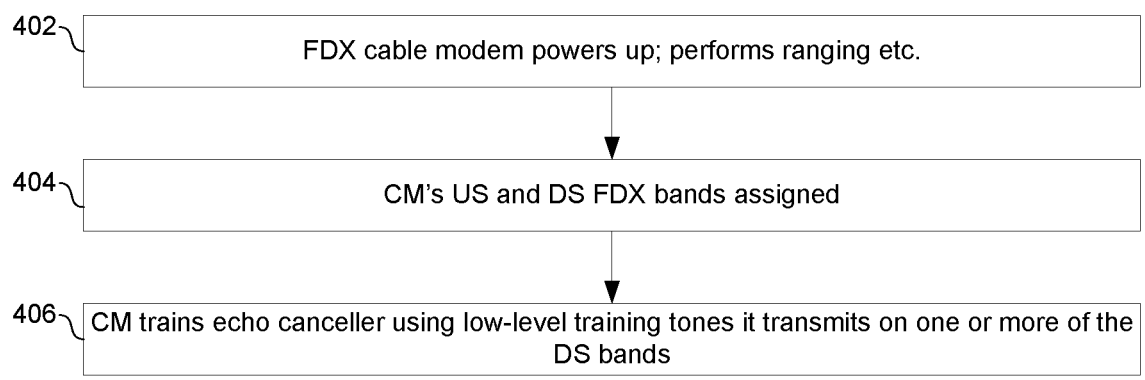
FIG. 4 is a flowchart illustrating an example process for echo cancellation training of a full-duplex cable modem.

FIG. 4 is a flowchart illustrating an example process for echo cancellation training of a full-duplex cable modem. The process begins with block 402 in which cable modem $112_n$ is connected to the coaxial network, powers up, and goes through synchronization, ranging, etc. to register with the CCAP core 102. Later, in block 404, the cable modem $112_n$ determines (e.g., based on error rates measured in the physical layer circuitry 151 and/or in the higher layer circuitry 191) that it must train its echo cancellation circuitry in order to successfully receive on one or more full-duplex (FDX) downstream subbands. In block 406, the cable modem $112_n$ transmits echo canceller training signals (e.g., as described above with respect to FIGS. 3A and 3B). In an example implementation, such training may take place at a time designated by the CCAP core 102 (e.g., in a MAP message) as, for example, described below with reference to FIG. 5A. In an example implementation, such training may take place at a time autonomously determined by the cable modem $112_n$ based on a deterministic algorithm, as, for example, described below with reference to FIG. 5B.

Figure 5A:
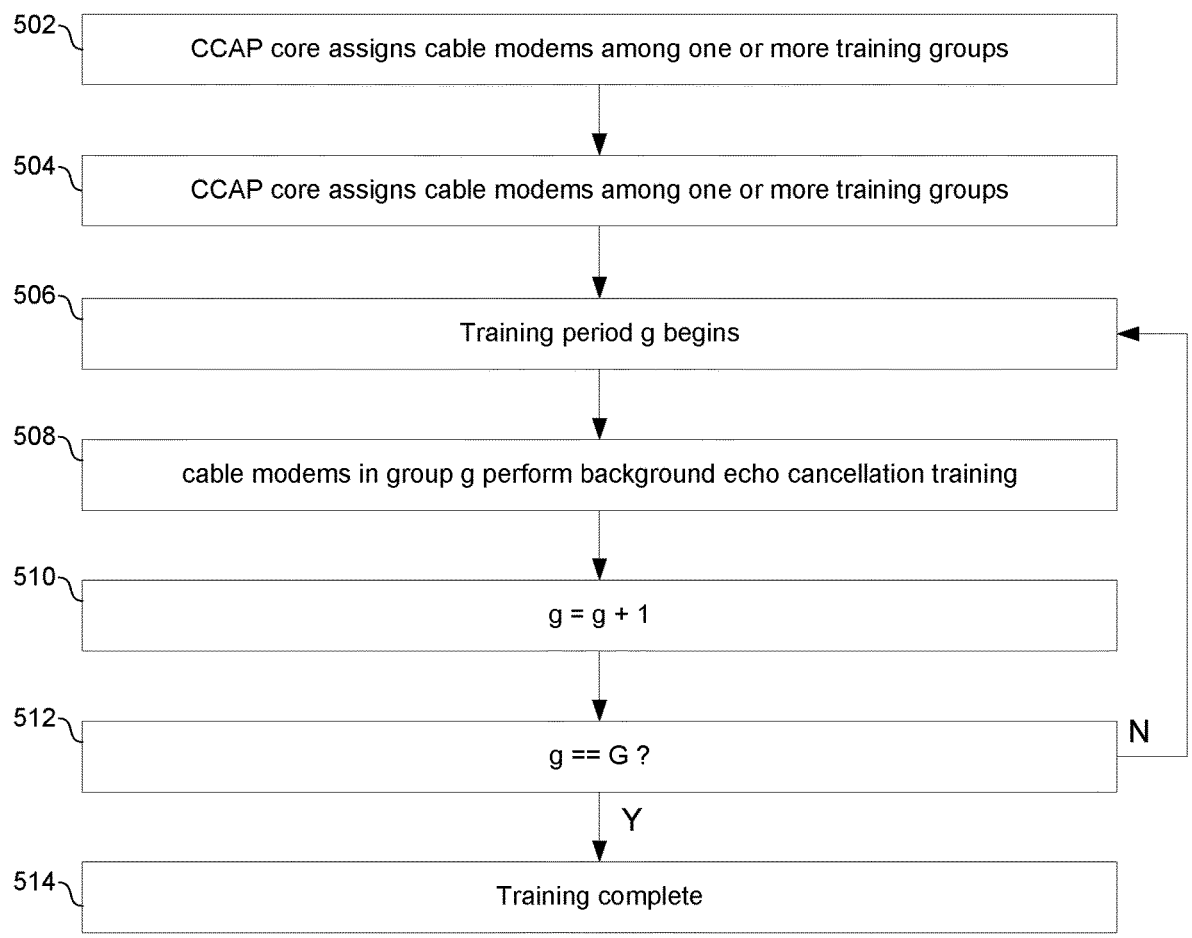
FIG. 5A illustrates an example process for coordinated background echo cancellation training of multiple full-duplex cable modems.

FIG. 5A illustrates an example process for coordinated background echo cancellation training of multiple full-duplex cable modems. The process begins in block 502 in which the CCAP core 102 assigns each of a plurality of FDX cable modems $112_i$ to one of G (an integer) training groups. The CCAP core 102 may assign each cable modem $112_n$ to a training group based on, for example: the location of the cable modem $112_n$ in the network (e.g., the trunk and/or branch via which the CM $112_n$ is connected to the CCAP core 102); characteristics of signals received from the CM $112_n$ (e.g., received signal strength of signals transmitted from the CM $112_n$, an error rate of signals received from the CM $112_n$, and/or the like); and/or any other suitable parameter. The cable modem $112_n$ may, for example, store the assignment in memory 192.

In block 504, the CCAP core 102 allocates one or more training periods to each of the G training groups. The training periods may be of uniform duration or some groups may get longer training periods than other groups. The training periods may be valid only for a specific time frame (e.g., a certain number of MAPs), or may be an open-ended cyclically repeating allocation unless and until the CCAP core 102 changes them. The CCAP core 102 communicates the training period to training group assignments to the cable modems (e.g., in one or more MAP messages). The cable modem 112n may, for example, store the training period assignment in memory 192.

In block 506, training interval g begins at the predetermined time established by the CCAP core 102.

In block 508, cable modems 112 in training group g perform echo cancellation training by transmitting low level tones as described above with reference to FIGS. 3A and 3B.

In blocks 510 and 512 it is determined whether all G training periods have completed. If not, the process returns to block 506. If so, then the process completes in block 514. Blocks 506 through 514 may be repeated at a later time.

Figure 5B:
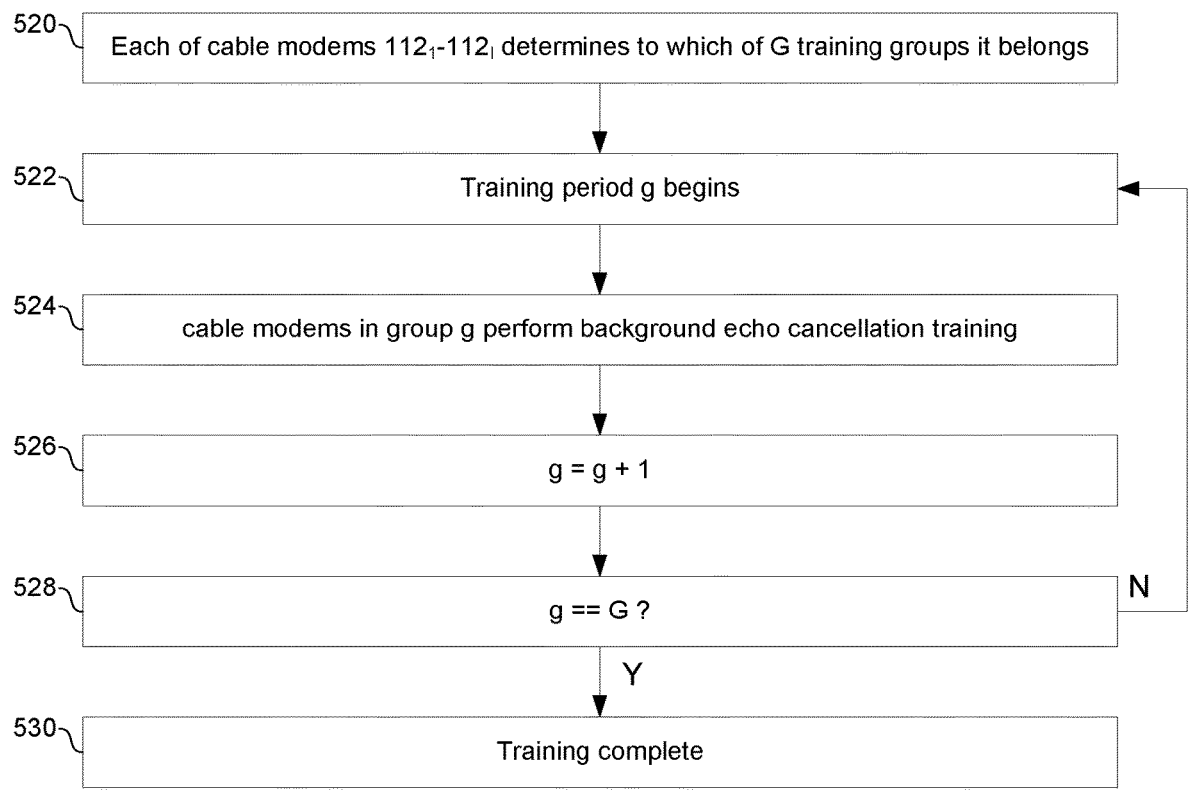
FIG. 5B illustrates another example process for coordinated background echo cancellation training of multiple full-duplex cable modems.

FIG. 5B illustrates another example process for coordinated background echo cancellation training of multiple full-duplex cable modems. The process of FIG. 5B is similar to the process of FIG. 5A except in FIG. 5B each cable modem $112_n$ can autonomously determine when it is permitted to perform background echo cancellation training without need of an explicit assignment message from the CCAP core 102. For example, in block 520 each cable modem $112_n$ may determine the training group to which it belongs based on: digits of an IP address assigned to the cable modem $112_n$ (e.g., the last digit of a cable modem's IP address (in decimal) may be the identifier of its training group); a transmit power level established for each cable modem during ranging (e.g., cable modems with transmit power levels within a first range belong to a first group, cable modems with transmit power levels within a second range belong to a second group, and so on); a service group to which the cable modem was assigned during registration with the network; and/or any other suitable parameter(s).

In accordance with an example implementation of this disclosure, a system (e.g., cable modem $112_n$) comprises transceiver circuitry (e.g., circuitry of the physical layer 151) and echo cancellation training circuitry (e.g., 196 and 192). The transceiver circuitry may be operable to transmit and receive signals on a full-duplex Data Over Cable System Interface Specification (DOCSIS®) network. The echo cancellation training circuitry may be operable to: determine an echo cancellation training group to which the electronic communication device belongs; determine one or more training periods during which the echo cancellation training group is permitted to transmit training signals; and transmit an echo cancellation training signal during the determined training one or more periods and use the transmitted training signal to train echo cancellation circuitry (e.g., 172 and/or 174) of the cable modem. The echo cancellation training circuitry may be operable to determine the echo cancellation training group based on an identification of the echo cancellation training group received in a message from a converged cable access platform (e.g., in a MAP message). The echo cancellation training circuitry may be operable to determine the echo cancellation training group using a deterministic algorithm and characteristics of the cable modem. The characteristics of the cable modem may comprise, for example, one or more of: its Internet Protocol (IP) address, transmit power determined for the cable modem during DOCSIS ranging, and a DOCSIS service group to which the cable modem is assigned. The training periods may be valid for a time interval corresponding to a determined number of media access plan (MAP) messages or may be cyclically-repeating until changed by a converged cable access platform. The echo cancellation training signal may comprise a plurality of tones transmitted at a power level that is below a determined threshold. The determined threshold may be determined based on the number of cable modems in the echo cancellation training group (e.g., fewer modems in a group may permit a higher threshold while still keeping interference at the CCAP below a limit).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the methods described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a cable modem comprising:
transceiver circuitry operable to:
transmit and receive signals on a full-duplex Data Over Cable System Interface Specification (DOCSIS®) network; and
echo cancellation training circuitry operable to:
determine an echo cancellation training group to which the cable modem belongs;
determine one or more training periods during which the echo cancellation training group is permitted to transmit training signals; and
transmit an echo cancellation training signal during the determined one or more training periods and use the transmitted echo cancellation training signal to train echo cancellation circuitry of the cable modem.

2. The system of claim 1, wherein the echo cancellation training circuitry is operable to determine the echo cancellation training group based on an identification of the echo cancellation training group received in a message from a converged cable access platform.

3. The system of claim 1, wherein the echo cancellation training circuitry is operable to determine the echo cancellation training group using a deterministic algorithm and characteristics of the cable modem.

4. The system of claim 3, wherein the characteristics of the cable modem comprise its Internet Protocol (IP) address.

5. The system of claim 3, wherein the characteristics of the cable modem comprise transmit power determined for the cable modem during DOCSIS ranging.

6. The system of claim 3, wherein the characteristics of the cable modem comprise a DOCSIS service group to which the cable modem is assigned.

7. The system of claim 1, wherein the one or more training periods are valid for a time interval corresponding to a determined number of media access plan (MAP) messages.

8. The system of claim 1, wherein the one or more training periods are cyclically-repeating until changed by a converged cable access platform.

9. The system of claim 1, wherein the echo cancellation training signal comprises a plurality of tones transmitted at a power level that is below a determined threshold.

10. The system of claim 9, wherein the determined threshold is determined based on a quantity of cable modems in the echo cancellation training group.

11. A method comprising:
in a cable modem configured to communicate on a full-duplex Data Over Cable System Interface Specification (DOCSIS®) network:
determining an echo cancellation training group to which the cable modem belongs;
determining one or more training periods during which the echo cancellation training group is permitted to transmit training signals; and
transmitting an echo cancellation training signal during the determined one or more training periods and using the transmitted training signal to train echo cancellation circuitry of the cable modem.

12. The method of claim 11, comprising determining the echo cancellation training group based on an identification of the echo cancellation training group received in a message from a converged cable access platform.

13. The method of claim 11, comprising determining the echo cancellation training group using a deterministic algorithm and characteristics of the cable modem.

14. The method of claim 13, wherein the characteristics of the cable modem comprise its Internet Protocol (IP) address.

15. The method of claim 13, wherein the characteristics of the cable modem comprise transmit power determined for the cable modem during DOCSIS ranging.

16. The method of claim 13, wherein the characteristics of the cable modem comprise a DOCSIS service group to which the cable modem is assigned.

17. The method of claim 11, wherein the one or more training periods are valid for a time interval corresponding to a determined number of media access plan (MAP) messages.

18. The method of claim 11, wherein the one or more training periods are cyclically-repeating until changed by a converged cable access platform.

19. The method of claim 11, wherein the echo cancellation training signal comprises a plurality of tones transmitted at a power level that is below a determined threshold.

20. The method of claim 19, wherein the determined threshold is determined based on a quantity of cable modems in the echo cancellation training group.

* * * * *